United States Patent
Costello et al.

(10) Patent No.: US 9,927,553 B2
(45) Date of Patent: Mar. 27, 2018

(54) MINIATURIZED OPTICAL PROXIMITY SENSOR

(71) Applicant: Avago Technologies General IP (Singapore) Pte. Ltd., Singapore (SG)

(72) Inventors: James Costello, Singapore (SG); Cherng Woei Heng, Sembilan (MY); Boon Keat Tan, Singapore (SG)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 67 days.

(21) Appl. No.: 14/962,960

(22) Filed: Dec. 8, 2015

(65) Prior Publication Data
US 2017/0160427 A1    Jun. 8, 2017

(51) Int. Cl.
*G01B 11/14*    (2006.01)
*G01V 8/12*    (2006.01)
*G01J 1/02*    (2006.01)

(52) U.S. Cl.
CPC ............. *G01V 8/12* (2013.01); *G01J 1/0204* (2013.01)

(58) Field of Classification Search
CPC ................................ G01J 1/0204; G01V 8/12
USPC .................... 356/614–615, 213–236
See application file for complete search history.

(56) References Cited

U.S. PATENT DOCUMENTS

2010/0259766 A1\* 10/2010 Wiese ............... H01L 25/167
                                                                  356/614
2015/0041630 A1    2/2015 Heng et al.

\* cited by examiner

*Primary Examiner* — Tri T Ton
(74) *Attorney, Agent, or Firm* — Sheridan Ross P.C.

(57) ABSTRACT

An optical sensor, optical system, and proximity sensor are disclosed. An illustrative proximity sensor is disclosed to include a light source and a photodetector including a photo-sensitive area that receives incident light and converts the received incident light into an electrical signal. The light source and photodetector are positioned diagonally relative to one another, thereby enabling the devices to be positioned closer together on a body or substrate.

20 Claims, 11 Drawing Sheets

MINIATURIZED OPTICAL PROXIMITY SENSOR

FIELD OF THE DISCLOSURE

The present disclosure is generally directed toward sensing devices and, in particular, toward optical sensing devices.

BACKGROUND

There are many different types of sensors on the market, with each having specific capabilities, uses, and shortcomings. One particular type of sensor that utilizes light to detect objects is known as a proximity sensor.

Proximity sensors typically consist of a light source and a corresponding photodetector. The photodetector of a proximity sensor includes a number of photosensitive pixels. Proximity sensing (e.g., detecting a presence or proximity of an object near the sensor) involves transmitting light via the light source and then receiving light that reflects off an object-to-be-detected at the photodetector. The types of applications in which proximity sensors are used include mobile communication devices, industrial equipment, manufacturing equipment, etc.

Many proximity sensors are now being deployed in personal computing devices such as smartphones, laptops, Personal Digital Assistants (PDAs), tablets, etc. In particular, certain functions of the personal computing devices rely on a determination of whether or not an object is detected within a predetermined distance (e.g., within proximity) of the personal computing device. As with most components for personal computing devices, there is a general desire to miniaturize. More specific to proximity sensors, if a smaller proximity sensor can be achieved and the distance between the light source and photodetector can be reduced, then so too can the size of the opening in the computing device. It is, indeed, desirable to reduce the size of openings and holes in a computing device.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

With reference now to FIGS. 1-8, an optical sensing device 100, optical sensing modules, and computing devices that incorporate the same will be described in accordance with at least some embodiments of the present disclosure. It should be appreciated that any aspect of any optical sensing device or optical sensing module configuration can be used in combination with or in lieu of any other aspect of other optical sensing devices or optical sensing modules described herein. For instance, aspects of the optical sensing device in FIG. 1A may be utilized in combination with or in lieu of aspects of the optical sensing module depicted in FIGS. 4A and 4B (or any other configuration described herein). Alternatively or additionally, aspects of the optical sensing module depicted in FIGS. 5-7 can be applied to any of the optical sensing devices or optical sensing modules depicted and described herein.

Figure 1A:
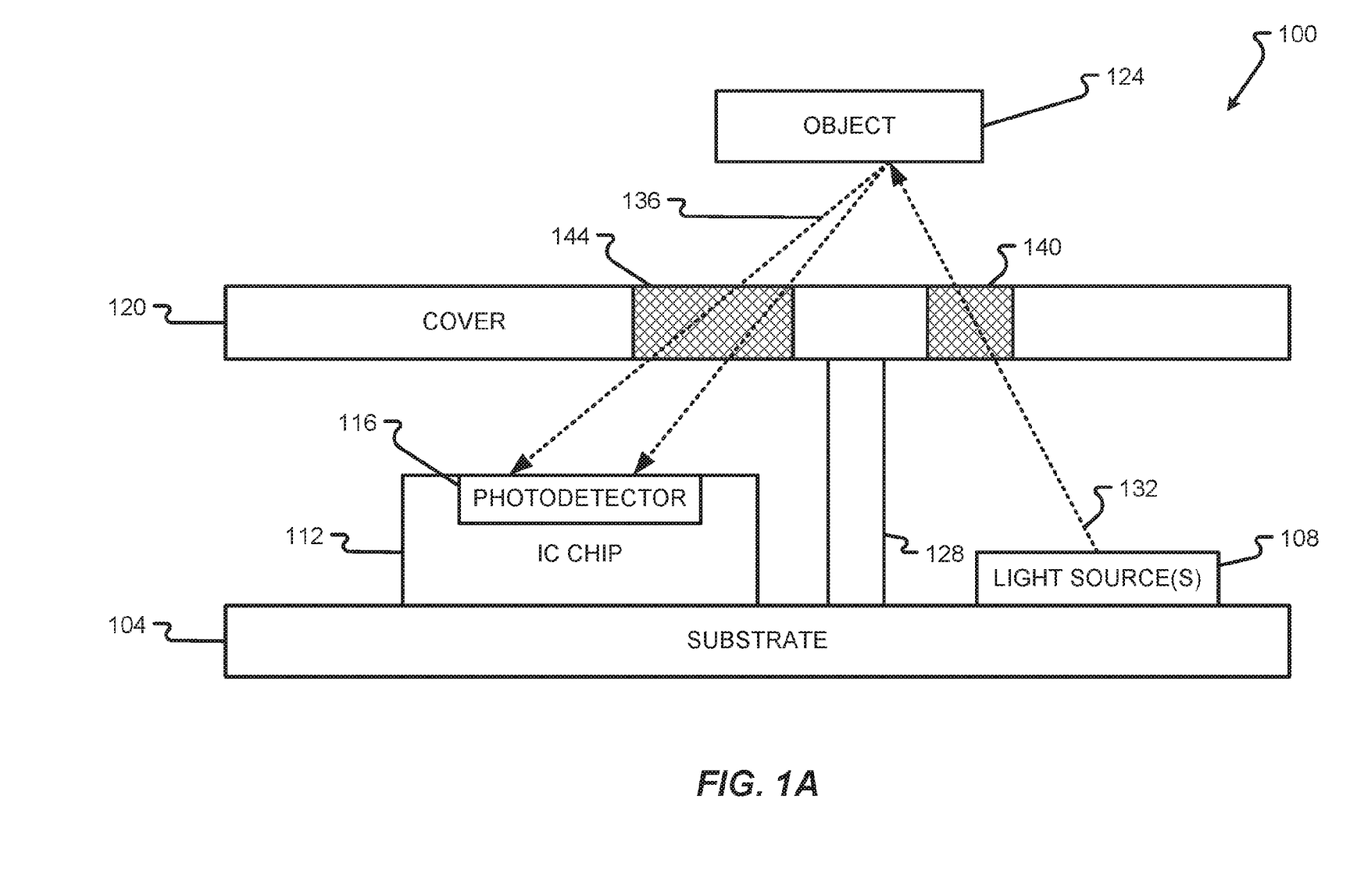
FIG. 1A depicts a block diagram of a sensing device in accordance with embodiments of the present disclosure.

Referring initially to FIG. 1, details of the optical sensing device 100 will be described in accordance with at least some embodiments of the present disclosure. The optical sensing device 100 is shown to include a substrate 104 on which an Integrated Circuit (IC) chip 112, one or more light sources 108, and a light barrier 128 are mounted. It should be appreciated that the substrate 104 may be divided into multiple substrates and each portion of the substrate 104 may support different components. Although not depicted, the substrate 104 may also physically support or be directly connected to a cover 120 that is used to protect the IC chip 112, light source(s) 108, and/or substrate 104 from environmental conditions. The substrate 104 may be a supporting material on which a circuit is formed or fabricated on. In one embodiment, the substrate 104 may be a printed circuit board. In another embodiment, the substrate 104 may be a molded lead frame portion configured to receive the one or more light sources 108, and/or the light barrier 128, and/or the IC chip 112. Although depicted as being flat, it should be appreciated that the bottom portion of the substrate 104 does not necessarily have to correspond to a flat surface. The cover 120 may alternatively or additionally help to minimize optical cross-talk between the light source(s) 108 and the photodetector 116 mounted on the IC chip 112. In some embodiments, the cover 120 may correspond to a piece of metal, composite, or plastic that is substantially non-transparent or opaque to emitted light 132 produced by the light source(s) 108. In some embodiments, the cover 120 may be manufactured separately and connected to the substrate 104 of the light barrier 128 (which may be in the form of a shield of enclosing metal structure). In some embodiments, the cover 120 is substantially parallel to the top surface of the substrate 104, although such a configuration is not required. Because the cover 120 may be substantially non-transparent or opaque to emitted light 132 produced by the light source(s) 108, the cover 120 may include one or more apertures 140, 144 to enable the emitted light 132 to reach the object 124 and to further allow reflected light 136 from the object 124 to reach the photodetector 116. Placement and other characteristics of the apertures 140, 144 will be further described in accordance with at least some embodiments of the present disclosure.

The substrate 104 may include any type of object or collection of objects capable of physically supporting the light source(s) 108 and/or IC chip 112. The substrate 104 may also include elements that enable current to pass between objects mounted thereto. As an example, the substrate 104 may include a Printed Circuit Board (PCB) or the like and the IC chip 112 and light sources 108 may be mounted to the substrate 104. Examples of technologies that may be used to connect the light source(s) 108 and/or IC chip 112 to the substrate 104 include, without limitation, thru-hole mounting technologies, surface mount technologies, flip-chip mounting technologies, or the like.

The light source(s) 108 may correspond to a single light source or a plurality of light sources. The light source(s) 108 may be configured to emit radiation of a predetermined wavelength either continuously, periodically, and/or intermittently. A driver for the light source(s) 108 (not depicted) may be used to provide a driving current to the light source(s) 108, which causes the light source(s) 108 to produced emitted light 132. The driver may employ logic to have the light source(s) 108 only emit light during a certain period of time during which proximity detection is being performed by the IC chip 112. When proximity detection is not being performed, the driver for the light source(s) 108 may not transmit a drive signal to the light source(s) 108, thereby resulting in no production of the emitted light 132. Examples of suitable light source(s) 108 include, without limitation, a Light Emitting Diode (LED), a collection of LEDs, a laser diode, a collection of laser diodes, a Vertical Cavity Surface Emitting Laser (VCASEL), a collection of VCSELs, or any other solid-state light-emitting device. As a non-limiting example, if multiple light sources 108 are used, then two or more of the different light sources 108 may be configured to emit light of the same characteristics (e.g., color, wavelength, frequency, etc.) or light of different characteristics.

Where the light source(s) 108 correspond to an LED, collection of LEDs, a VCSEL or collection of VCSELs, the light source(s) 108 may have one or more wire bonds connecting the light source(s) 108 to a lead on the substrate 108. The one or more wire bonds may be oriented in such a fashion as to reduce scattered reflections. More specifically, where the light source(s) 108 include a VCSEL, the wire bonds may be oriented away from the photodetector 116, thereby reducing scattered reflections from the VCSEL beam. In a similar fashion, wire bonds used to connect the IC chip 112 to the substrate 104 may be made over the IC chip 112 to minimize the overall size of the sensing device 100 and to minimize scattering of the reflected light 136 before it impacts the photodetector 116.

The IC chip 112 may include any type of known digital processing components (e.g., transistors, logic gates, latches, etc.). In some embodiments, the IC chip 112 may include its components in a silicon format. The photodetector 116 may correspond to an optically sensitive set of pixels established on or in the IC chip 112 in an array or the like. For example, the photodetector 116 may correspond to an array of photo-sensitive pixels established across the exposed surface of the IC chip 112 (e.g., the surface facing away from the substrate 104). The photodetector 116 may be configured to convert incident light into electrical signals that are transferred to other components of the IC chip 112, processed, and eventually results in the IC chip 112 producing an output via one or more of its leads that are connected to the substrate 104.

In some embodiments, light received by the photodetector 116 may result in the creation of a first electrical signal that is provided to a first set of processing components in the IC chip 112. As can be appreciated, the barrier 128 may be configured to minimize cross-talk between the light source(s) 108 and the photodetector 116. In particular, the barrier 128 may be configured to limit or minimize the emitted light 132 from travelling directly to the photodetector 116, thereby resulting in false object readings by the IC chip 112. As shown in FIG. 1, however, a cover 120 can be used to further limit cross-talk between the light source(s) 108 and photodetector 116. In some embodiments, emitted light 132 travels from the light source(s) 108 through the first aperture 140 in the cover 120. The emitted light 132 then impacts the object 124, resulting in the creation of reflected light 136. The reflected light 136 then travels through the second aperture 144 until it impacts the photodetector 116. The cover 120 and its apertures 140, 144 along with the barrier 128 may be configured to help minimize cross-talk between the light source(s) 108 and photodetector 116. As will be discussed in further detail herein, the positioning of the apertures 140, 144, light source(s) 108, and/or photodetector 116 may be strategically selected so as to minimize the distance between the light source(s) 108 and photodetector 116, thereby resulting in a minimized distance between the apertures 140, 144.

The cover 120, as will be discussed in further detail herein, may be substantially non-transparent or opaque to light emitted by the light source(s) 108. In some embodiments, the emitted light 132 produced by the light source(s) 108 may correspond to infrared light or light of some other wavelength not visible to the naked human eye. The cover 120 may be made of plastic, metal, a composite, or any other solid material.

Figure 1B:
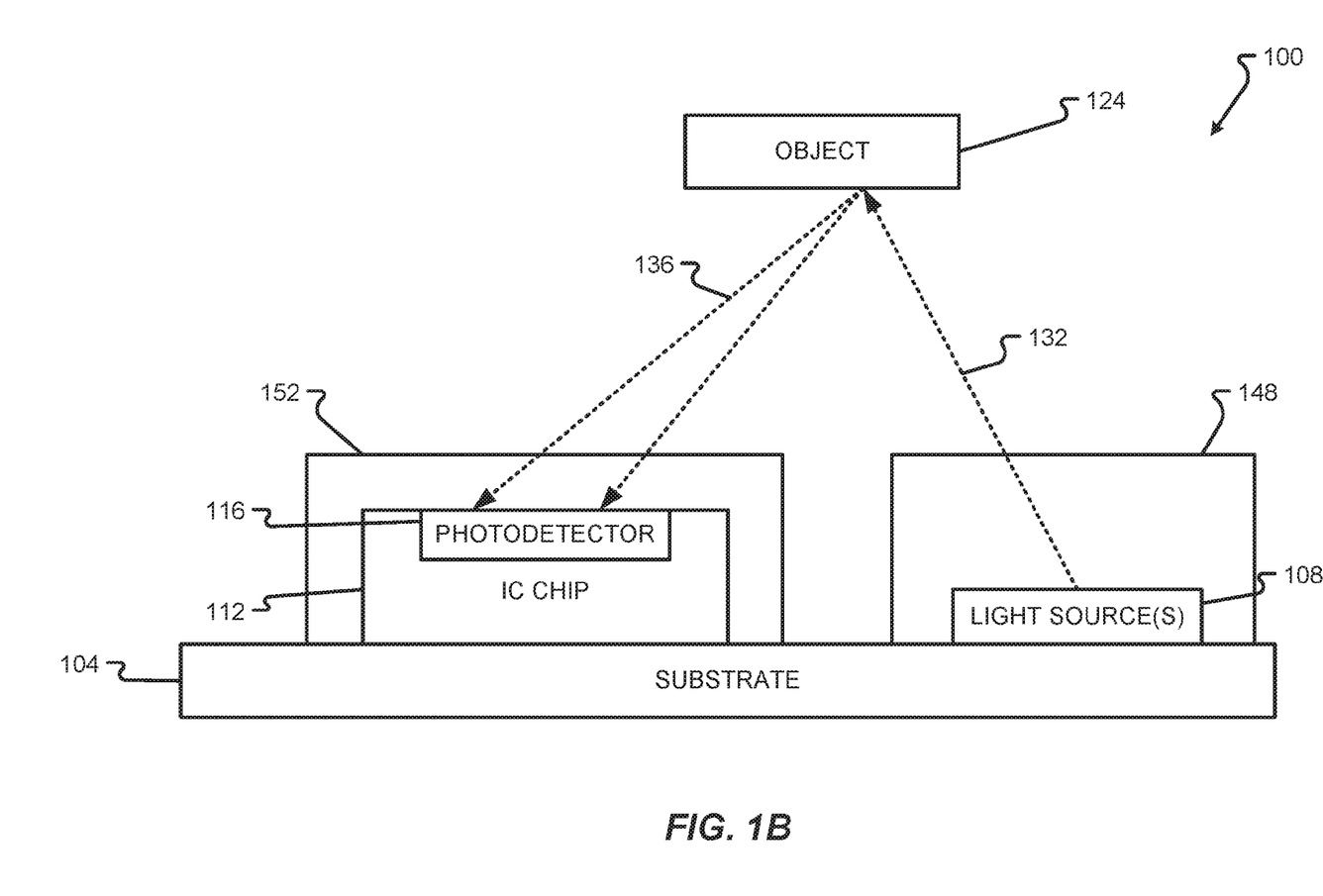
FIG. 1B depicts a block diagram of an alternative configuration of a sensing device in accordance with embodiments of the present disclosure.

FIG. 1B depicts an alternative configuration of the sensing device 100 in accordance with at least some embodiments of the present disclosure. This particular configuration of the sensing device 100 is shown without a cover 120, but rather with one or more light-directing optical elements 148, 152. Aspects of this particular configuration can alternatively or additionally be used in connection with the configuration of FIG. 1A. For instance, a sensing device 100 may include both a cover 120 and one or more optical elements 148, 152.

The configuration of FIG. 1B may be referred to as a double mold configuration. The double mold configuration refers to the mold process used to form the optical elements 148, 152 on the top surface of the substrate 104. With a second optically opaque material molded over 148, 152; to provide a barrier between 148, 152. But also to reduce crosstalk from the window which the device sits behind in the customer application. In some embodiment where the cover 120 provides only one common opening for both the light source 108 and the photo-detector 116, the barrier as provided by the second optically opaque material to prevent crosstalk may be more popular as crosstalk. In some embodiments, the optical elements 148, 152 may correspond to molded lenses or the like, which are formed to encapsulate the light source(s) 108 and IC chip 112 and to further direct the light 132, 136 along a predetermined path. In particular, the optical elements 148, 152 may be configured to direct or shape the light along a path that travels from the light source(s) 108 to the object 124 and then to the photodetector 116. Even more specifically, the first optical element 148 may correspond to a molded lens or the like that helps steer the emitted light toward the object 124 and away from being directly incident on the photodetector 116 (thereby reducing cross-talk). The second optical element 152 may be configured to help focus the reflected light 136 onto the active area of the photodetector 116. As one example, both the first and second optical elements 148, 152 may include dome-shaped lenses that are formed of a molded plastic, glass, ceramic, composite, or some other light-transmissive material. As opposed to the cover 120, the optical elements 148, 152 may be transparent or semi-transparent to the emitted light 132 and reflected light 136, thereby allowing the light to travel along its desired path to/from the object 124.

With reference now to FIGS. 2A, 2B, 2C, and 3, additional details of an optical sensing module 200 will be described in accordance with at least some embodiments of the present disclosure. The optical sensing module 200 may comprise some or all of the elements of either sensing device 100 depicted in FIGS. 1A and 1B. A sensing module 200 may, therefore, correspond to a packaged version of the sensing device 100. The sensing module 200 as compared to the sensing device 100 may include additional functionality, features, components, and/or a specific form factor of a sensing device 100. Many of the components of the sensing module 200 may be similar or identical to the components of the sensing device 100, but in a particular format, without departing from the scope of the present disclosure.

Figure 2A:
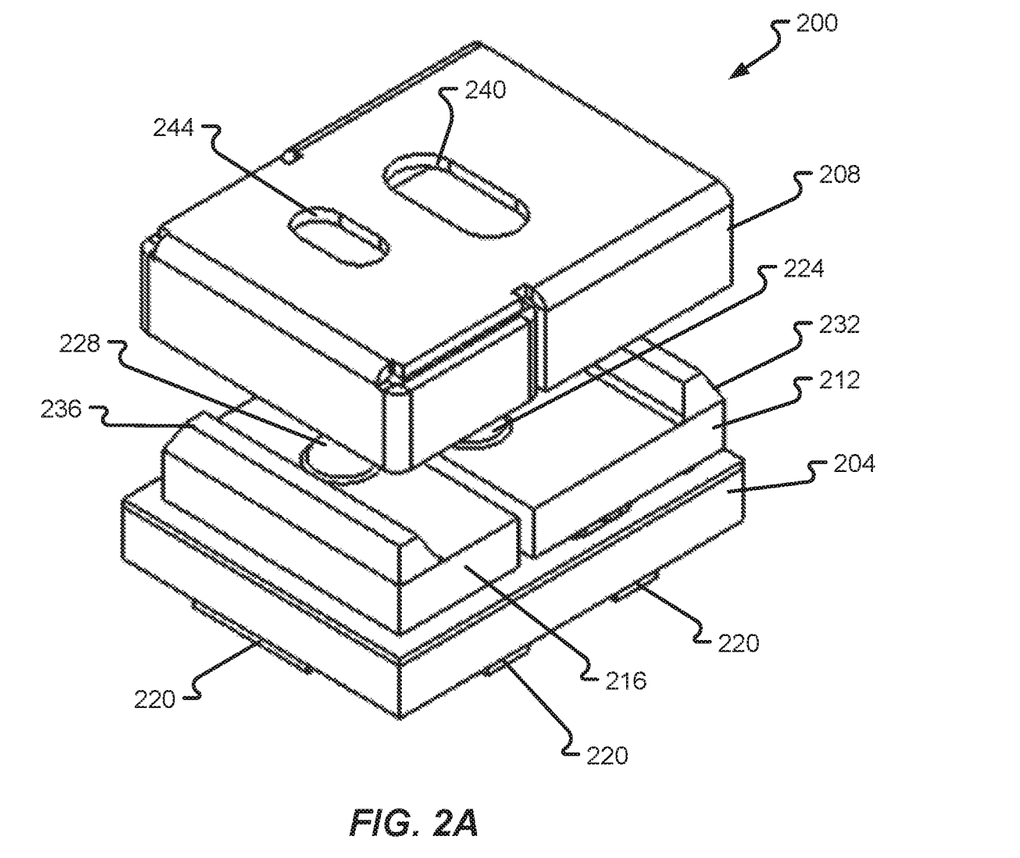
FIG. 2A is a top isometric view of an optical sensing module in accordance with embodiments of the present disclosure.
Figure 2B:
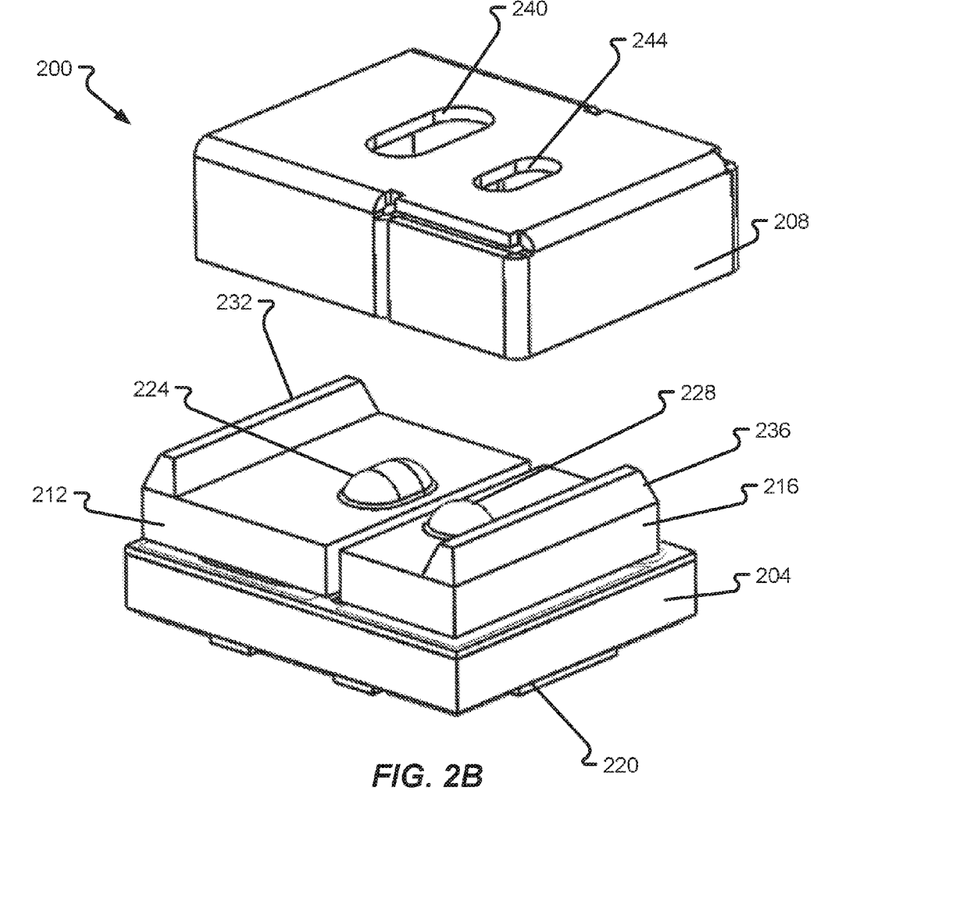
FIG. 2B is a second top isometric view of an optical sensing module in accordance with embodiments of the present disclosure.
Figure 2C:
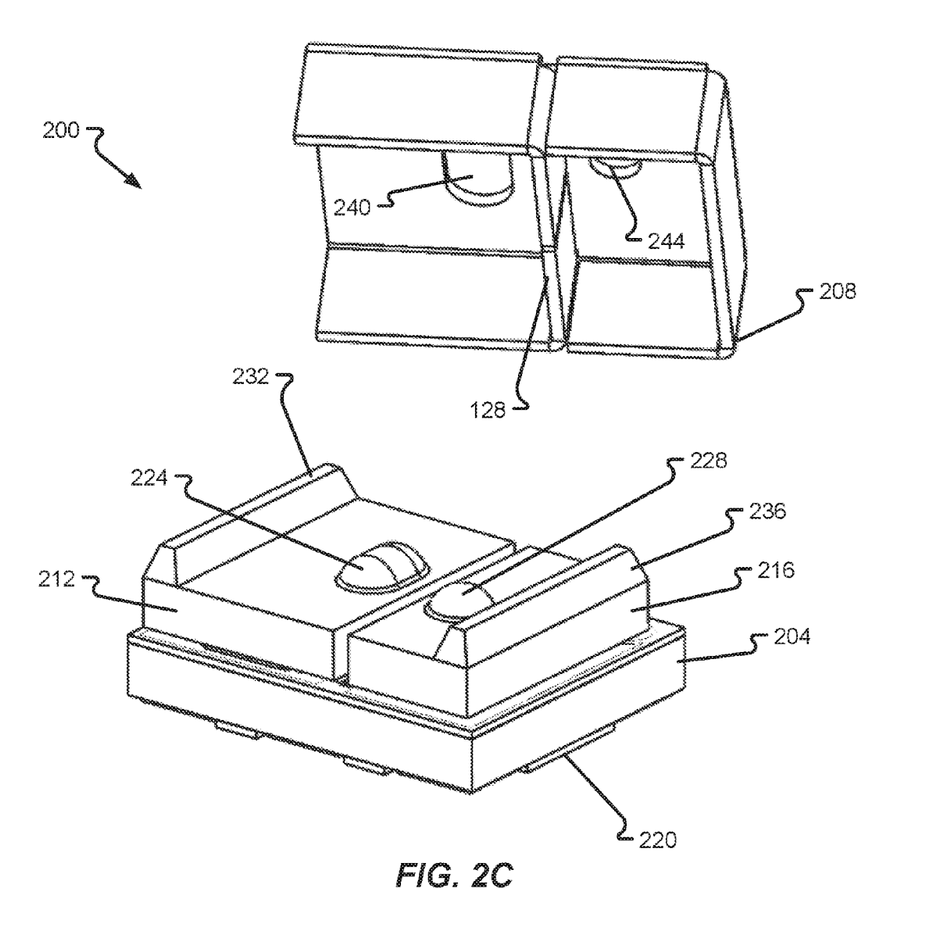
FIG. 2C is a third top isometric view of an optical sensing module in accordance with embodiments of the present disclosure.

The optical sensing module 200 of FIGS. 2A, 2B, 2C, and 3 is shown to include a body 204, a cover 208, a first optical element 212, a second optical element 216, and a plurality of electrical connectors 220. The optical sensing module 200 is shown in FIGS. 2A-C in an exploded view. FIG. 2A specifically shows the optical sensing module 200 with the cover 208 only partially removed whereas FIG. 2B shows the cover 208 fully removed and FIG. 2C shows an underside of the cover 208. When fully constructed, the cover 208 may fit entirely over the body 204, thereby enclosing the first optical element 212 and second optical element 216 between the cover 208 and the body 204. FIG. 2C further shows how the cover 208 may include the barrier 128 as an integral part thereof. The cover 208 is also shown to fully enclose the second optical element 216 but has one open end (e.g., only three sidewalls surrounding) the first optical element 212.

The first optical element 212 and the second optical element 216 may be configured to direct light towards a predetermined direction. In the depicted embodiment, the first optical element 212 and the second optical element 216 may correspond to a lens, prism, or the like. In some embodiments, each of the first optical element 212 and the second optical element 216 may have a dome shape. In the embodiment shown in FIGS. 2A-C, both the first optical element 212 and the second optical element 216 are shown to include a centroid or a gravity center that is positioned substantially on a center of the dome shaped lens. Generally, the lens includes an apex or peak that is a top point (e.g., highest location) of the dome shape. Although it is not required that the apex of the lens be coincident with the center of gravity/centroid of the lens, such an embodiment is possible. In some embodiments, the apex and the gravity center may be coincident with a center axis of the lens. In some embodiments, the apex and the center of gravity of the lens may not be aligned or coincident.

In some embodiments, the body 204 and electrical connectors 220 may correspond to an example of substrate 104. Thus, the body 204 and electrical connectors 220 may collectively correspond to a PCB or the like that supports the other components of the optical sensing module 200.

The cover 208 may correspond to an example of cover 120. The cover 208 is specifically shown to be a folded piece of material that includes a top surface and a plurality of sidewalls surrounding the top surface. The top surface of the cover 208 is shown to include a first aperture 240 and second aperture 244, the first aperture 240 is larger than the second aperture 244. While the apertures 240 and 244 are shown to be of substantially the same shape (e.g., pill-shaped), it should be appreciated that the apertures 240, 244 do not necessarily need to have similar shapes. The apertures 240, 244 may correspond to specific examples of apertures 140, 144. In some embodiments, when the cover 208 is completely in place over the body 204, the first aperture 240 may be positioned over the light source 108, which may be encapsulated by the first optical element 212. Similarly, when the cover 208 is complete in place over the body 204, the second aperture 244 may be positioned over the IC chip 112, which may be encapsulated by the second optical element 216. Because the first and second optical elements 212, 216 substantially encapsulate the light source 108 and IC chip 112, respectively, the light source 108 and IC chip 112 are not shown in FIGS. 2 and 3.

In the depicted embodiment, the first optical element 212 is shown to include a first lens 224, and a first alignment feature 232. The second optical element 216 is shown to include a second lens 228 and a second alignment feature 236. In some embodiments, the optical sensing module 200 may comprise one of the first alignment feature 232 and the second alignment 236 and not both as illustrated in the depicted embodiment. The first lens 224 and second lens 228 may correspond to the light-directing portions of the first optical element 212 and second optical element 216, respectively. The first alignment feature 232 and second alignment feature 236 may correspond to physical portions of the optical elements 212, 216 that help align the cover 208 with the body 204 and, therefore, with the light source(s) 108 and IC chip 112. In particular, the alignment features 232, 236 may include one or more tapered features or protrusions that extend above the lenses 224, 228. The alignment features 232, 236 may interface with the sidewalls of the cover 208 or a top portion of the cover 208, thereby guiding the cover 208 to a predetermined position while the cover 208 is being placed on top of the body 204. The alignment features 232, 236 may further include a top portion that directly contacts and supports the underside of the top face of the cover 208. Thus, the alignment features 232, 236 may provide a support mechanism for the cover 208. In some embodiments, the alignment features such as the first alignment feature 232, and/or the second alignment feature 236 may provide an interlock mechanism to interlock the cover 208 to the first and second optical elements 212, 216 respectively. The cover 208 may have a friction fit or snap fit with the body 204 at the point where the cover 208 begins to contact with the alignment features 232, 236. Alternatively or additionally, glue, adhesives, or the like can be used to secure the cover 208 to the body 204 and the alignment features 232, 236 may help to support the cover 208 and maintain a predetermined distance between the top surface of the cover 208 and the top surface of the body 204. In some embodiments, the cover 208 may comprise one or more apertures or holes that interface or mate with the alignment features 232, 236, thereby providing a precise fit between the cover 208, the alignment features 232, 236, and the body 204.

The electrical connectors 220 may be used to carry electrical current to/from the light source(s) 108 and/or IC chip 112. In particular, the electrical connectors 220 may be used to connect the optical sensing module 200 to a larger circuit board or the like, thereby providing electrical communication between the optical sensing module 200 and other circuitry (analog or digital). While the electrical connectors 220 are shown as being surface mount-type connectors, it should be appreciated that the module 200 may be configured for thru-hole mounting, in which case the connectors 220 may include pins, extended leads, or the like.

Figure 3:
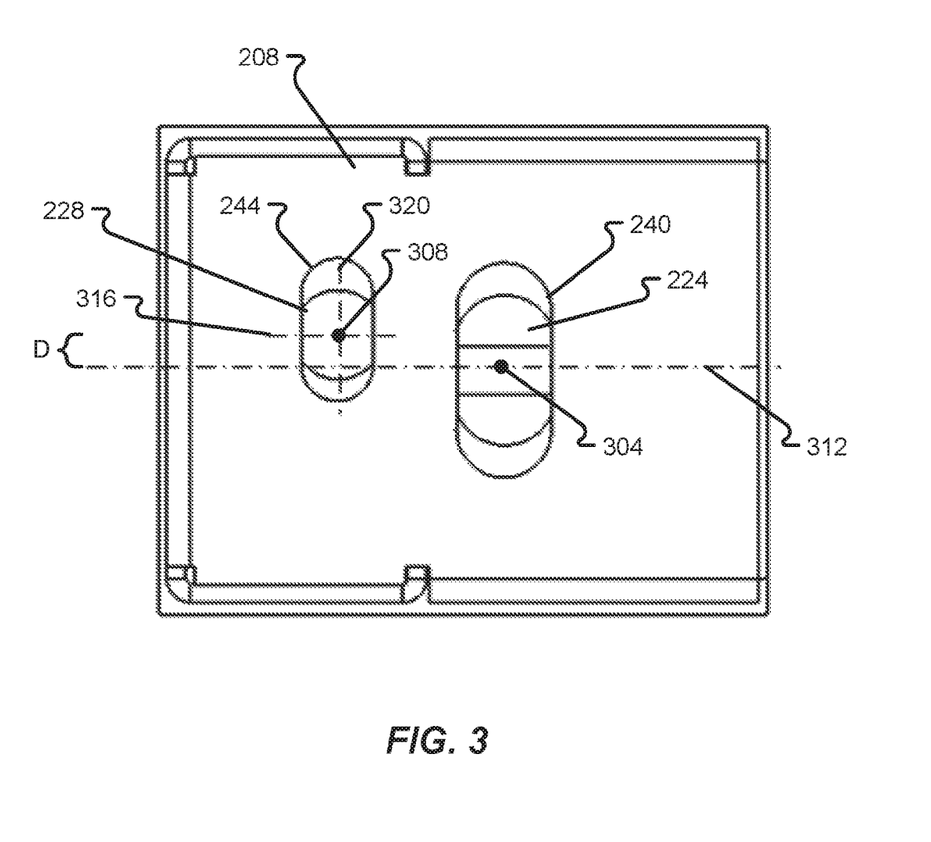
FIG. 3 is a top view of the optical sensing module depicted in FIGS. 2A-C.

With specific reference now to FIG. 3, the particular alignment of the apertures 240, 244 and the optoelectronic components (e.g., light source(s) 108 and/or photodetectors 116) on the body 204 will be described in accordance with at least some embodiments of the present disclosure. The sensing module 200 is shown to have the first aperture 240 and the first lens 224 with their centroids or centers substantially aligned with one another and further aligned along a first axis 312. The first axis 312 may be positioned exactly on a center axis that extends through a center of the module 200. More specifically, the center axis 312 may be thought to bisect (e.g., cut in half) the body 204, the cover 208, and the first and second optical elements 212, 216. In other embodiment, the first axis 312 may be offset from the center axis.

A centroid of a lens may be a gravity center of the lens, an apex point of the lens, or a substantially center portion of the lens. For example, the first centroid 304 of the first lens 224 may also be aligned with a center or centroid 304 of the light source 108 and/or a center or centroid of the first aperture 240, which may correspond to a VCSEL or the like. The light source 108 may be configured to emit light 132 substantially along the first axis 312 and the direction of this light transmission may be controlled, at least in part, by the first lens 224. The shape of the first lens 224 may also be symmetrical about the first axis 312. The first centroid 304 may correspond to a center of mass, center of area, center of volume, etc. for the first optical element 212, the light source 108, the first lens 224, and/or the first aperture 240. In some embodiments, the first centroid 304 may be substantially aligned with centers of each of the first optical element 212, the light source 108, the first lens 224, and the first aperture 240. In some embodiments, the first centroid 304 may correspond to a center of only one of the first optical element 212, the light source 108, the first lens 224, or the first aperture 240.

Whereas the first centroid 304 is substantially aligned on the first axis 312, a second centroid 308 is offset from the first axis 312 by an offset distance D. The second centroid 308 may correspond to a center of mass, center of area, center of volume, etc. for the second optical element 216, the photodetector 116, the IC chip 112, the second lens 228, and/or the second aperture 244. In some embodiments, the second centroid 308 corresponds to a center of the second lens 228 or second aperture 244 whereas the first centroid 304 corresponds to a center of the first lens 224 or the first aperture 240. A center line parallel to the first axis 316 is shown to extend through the first centroid 304 and bisect a center line perpendicular to the first axis 320. The center line parallel to the first axis 316 is offset from the first axis 312 by the offset distance D. As some non-limiting examples, the offset distance D may correspond to a distance of approximately 0.20 mm to approximately 0.70 mm. The entire size of the optical sensing module 200 may correspond to approximately 2.55 mm×2.05 mm×1.0 mm, which means that the offset distance D may be greater than 0.00 mm, but less than 30% of the overall width of the optical sensing module 200. In one embodiment, the offset distance D may be less than 10% of the overall width of the optical sensing module 200. Providing this offset distance D enables the centroids 304, 308 to be placed closer together than if no offset was allowed when the overall size of the optical sensing module 200 gets smaller. In other words, because the centroids 304, 308 are positioned diagonally relative to one another (with respect to a point of reference using the sides of the cover 208 and/or body 204), the space of the module 200 is optimized and the aperture 240, 244 do not have to be placed as far apart as if both centroids 304, 308 were aligned on the first axis 312. The first axis 312 and the center line parallel to the first axis 316 are shown to be parallel with two of the sidewalls of the cover 208 and two sides of the body 204 whereas the center line perpendicular to the first axis 320 is parallel with the other two sidewalls of the cover and two sides of the body 204.

Figure 4A:
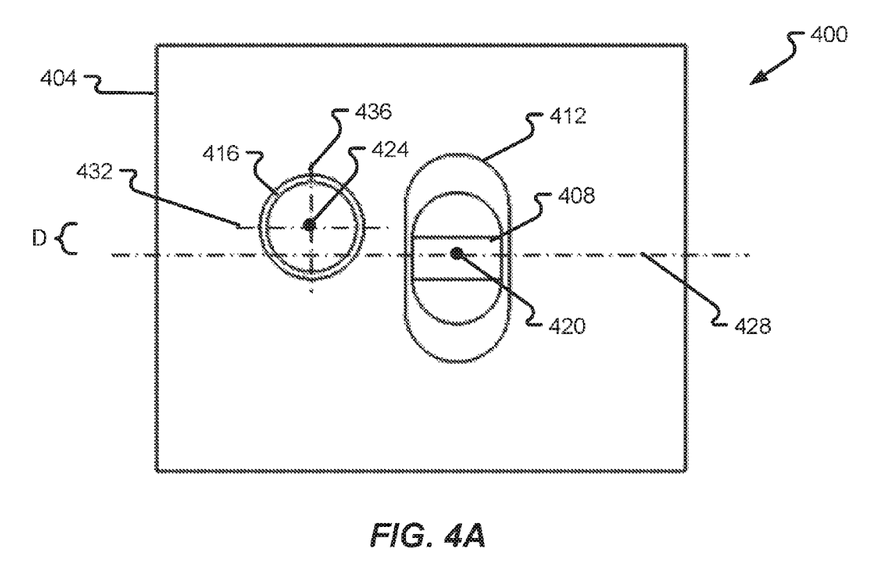
FIG. 4A is a top view of an alternative configuration of an optical sensing module in accordance with embodiments of the present disclosure.
Figure 4B:
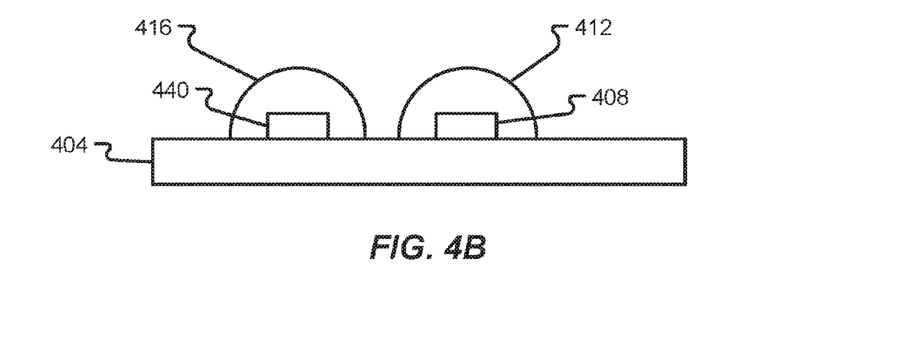
FIG. 4B is a side elevational view of the optical sensing module depicted in FIG. 4A.

With reference now to FIGS. 4A and 4B, additional details of an optical sensing module 400 will be described in accordance with at least some embodiments of the present disclosure. The optical sensing module 400 may comprise some or all of the elements of either sensing device 100 depicted in FIGS. 1A and 1B. Likewise, the optical sensing module 400 may share many similarities with the optical sensing module 200 and features from one module 200 may be incorporated into the other 400, and vice versa, without departing from the scope of the present disclosure. Sensing module 400 may correspond to a packaged version of the sensing device 100. The sensing module 400 as compared to the sensing device 100 may include additional functionality, features, components, and/or a specific form factor of a sensing device 100. Many of the components of the sensing module 400 may be similar or identical to the components of the sensing device 100, but in a particular format, without departing from the scope of the present disclosure.

The optical sensing module 400 of FIGS. 4A and 4B is shown to include a body 404, a first lens 412, and a second lens 416. One difference between the optical sensing module 400 and the optical sensing module 200 described in connection with FIGS. 2 and 3, is that optical sensing module 400 does not include a cover and may be referred to as a double molded version as opposed to a shielded sensing module.

The first lens 412 is shown to cover and substantially encapsulate light source 408, which may be similar or identical to light source 108. Likewise, the first lens 412 may be similar or identical to first optical element 148 and/or first optical element 212. The second lens 416 may be configured to cover and substantially encapsulate the light receiver 440, which may include or be the same as IC chip 112 and photodetector 116. Although not depicted, the sensing module 400 may include one or more electrical connectors 220, similar to module 200 as well as other circuit components, which may be mounted on the top and/or bottom surface of the body 404.

As shown in FIG. 4A, the optical sensing module 400 may have a similar configuration to module 200 in that a first centroid 420 of the light source 408 and/or first lens 412 may coincide with a first axis 428 that bisects the body 404. Of course, the first axis 428 does not necessarily need to bisect the body 404 into two equal pieces. The first axis 428 is, however, shown to be parallel to two opposing sides of the body 404 and perpendicular to the other sides of the body 404. A second centroid 424, which may coincide with a center of either the IC chip 112, photodetector 116, the light receiver 440, and/or the second lens 416 may be offset from the first axis 428 by an offset distance D. The magnitude of the offset distance D may be a fraction of the overall size of the module 400, but may be sufficient to enable a substantially smaller form of the module 400 as compared to if both centroids 420, 424 were aligned along the first axis 428.

Figure 5:
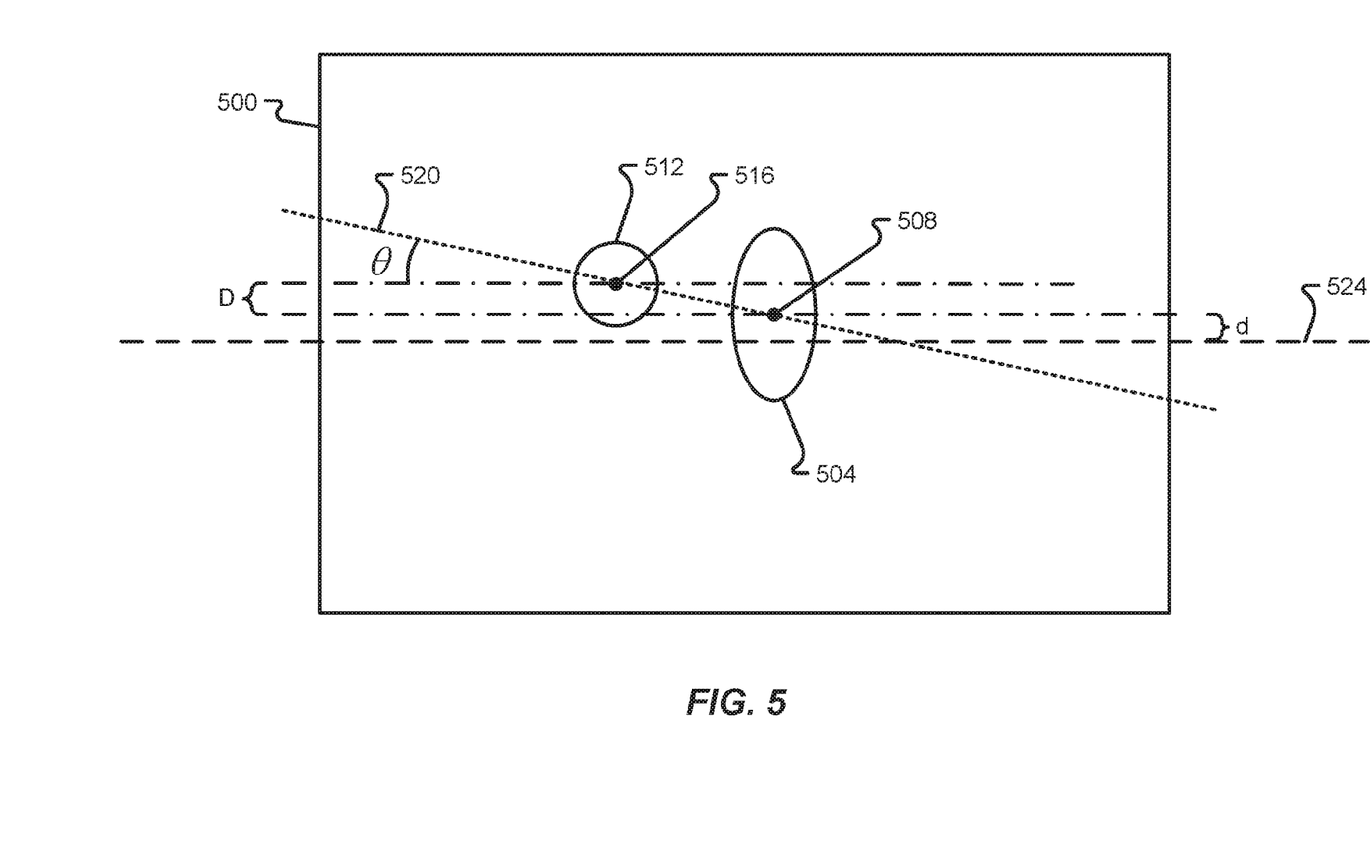
FIG. 5 is a first schematic diagram of an optical sensing module in accordance with embodiments of the present disclosure.
Figure 6:
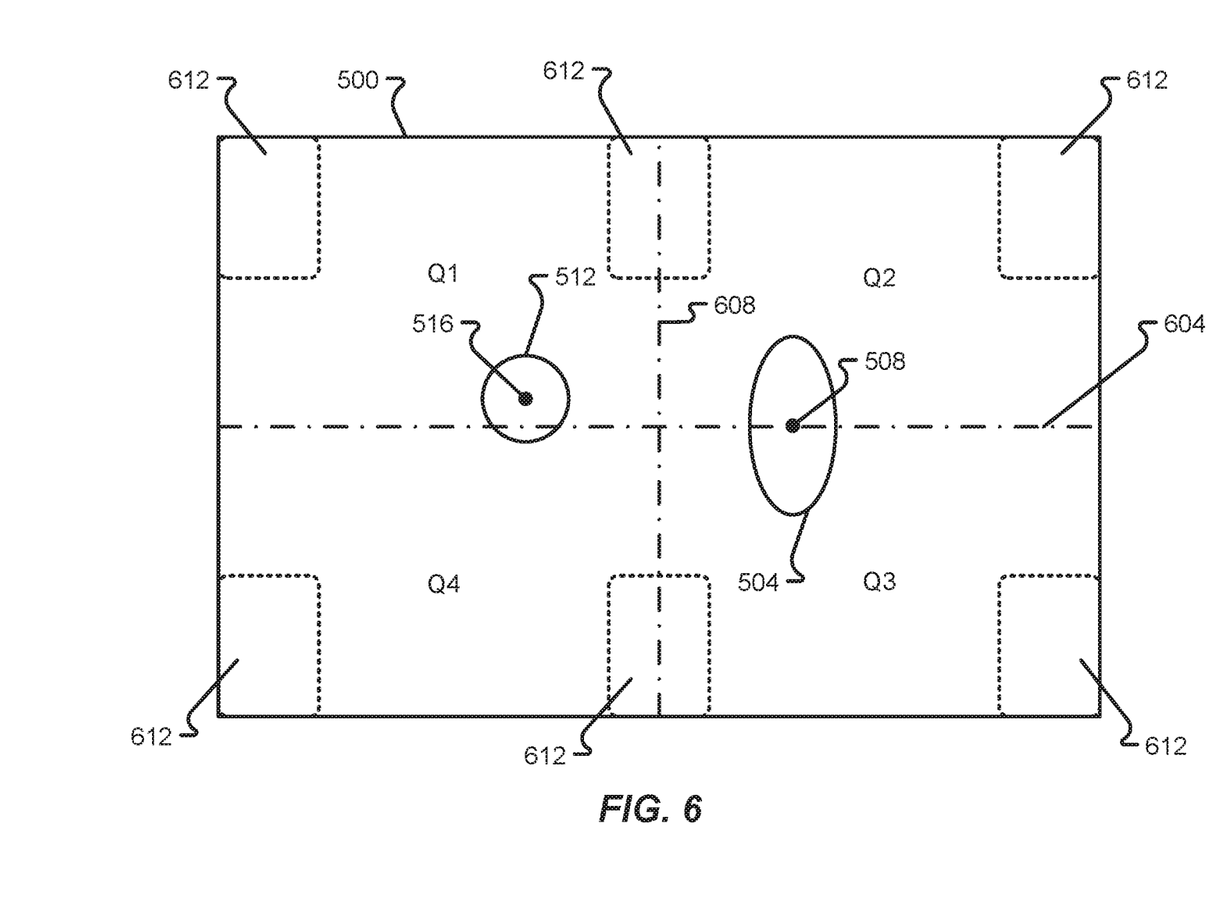
FIG. 6 is a second schematic diagram of an optical sensing module in accordance with embodiments of the present disclosure.
Figure 7:
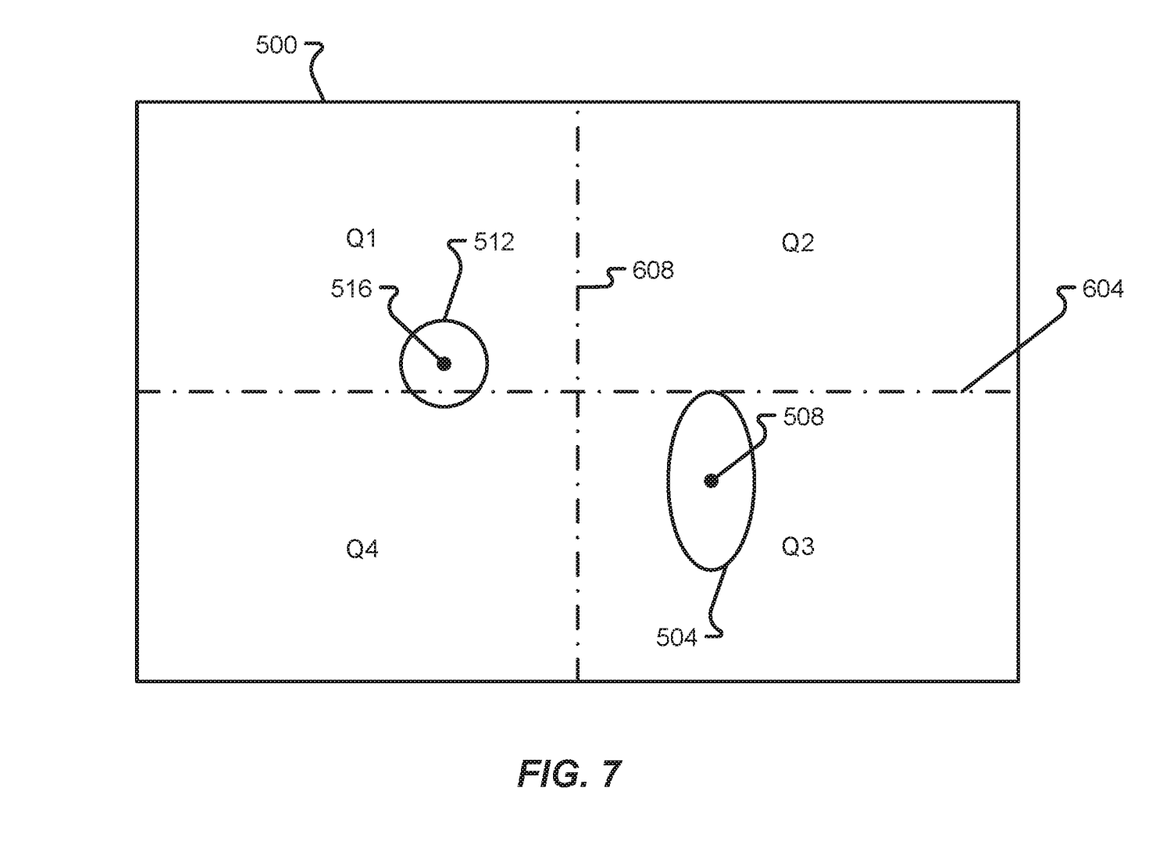
FIG. 7 is a third schematic diagram of an optical sensing module in accordance with embodiments of the present disclosure.

With reference now to FIGS. 5-7, various different schematic diagrams of a device 100, module 200, and/or module 400 will be described in accordance with at least some embodiments of the present disclosure. The elements depicted in FIGS. 5-7 may correspond to any instance of components described in connection with FIGS. 1-4B. The illustration of the simplified elements in FIGS. 5-7 is for ease of discussion. With reference initially to FIG. 5, a first schematic diagram is shown where an optical sensing module includes a body 500 having a transmitter assembly 504 and detector assembly 512 mounted thereon. The body 500 may correspond to an example of a substrate 104, body 204, and/or body 404. The transmitter assembly 504 may correspond to a light source 108, a collection of light sources 108, the first aperture 140, 240, a combination of a light source 108 and optical element 148, 212, a combination of a light source 108 and lens 224, 412, a combination of a light source 108, optical element 146, 212, and first aperture 140, 240, or any other combination thereof. The transmitter assembly 504 may be thought of as a simplified representation of the components used to produce emitted light 132 and, optionally, direct the emitted light 132 to the object 124. The detector assembly 512 may correspond to an IC chip 112, a photodetector 116, a light receiver 440, the second aperture 144, 244, a combination of light receiver 440 and second lens 228, 416, a combination of light receiver 440 and second optical element 152, 216, a combination of photodetector 116, second optical element 152, 216, and second aperture 144, 244, a combination of photodetector 116 and second aperture 144, 244, a combination of light receiver 440 and second aperture 244, or any other combination thereof. The detector assembly 512 may be thought of as a simplified representation of the components used to receive reflected light 136 and, optionally, direct the reflected light 136 to the photodetector 116.

In a more specific, but non-limiting example, the transmitter assembly 504 corresponds to a combination of the first lens 224, 412 and first aperture 140, 240 while the detector assembly 512 corresponds to a combination of the second lens 228, 416 and second aperture 144, 244. As shown in FIGS. 3 and 4A, a centroid 508 or center of the transmitter assembly 504 is offset from the centroid 516 or center of the detector assembly 512. It should also be appreciated that the centroid 508 may correspond to the apex of the transmitter assembly 504 and the centroid 516 may correspond to the apex of the detector assembly 512. In some embodiments, the apex of both lenses may or may not align with the centroids of the assemblies 504, 512, but the points being discussed herein may actually correspond to the apex of the lenses instead of the centroids of the assemblies or lenses.

In the depicted embodiment, the offset distance D between the two centroids 508, 516 (or apexes) may correspond to a distance sufficient to minimize the size of the body 500, but still allow for quality optical communications between the light source(s) 108 and photodetector 116. FIG. 5 further depicts a center axis 524 that substantially travels through the center of the body 500 and bisects the body 500 into two equally-sized portions or halves. Although the centroid 508 of the transmitter assembly 504 (or apex of the lens of the transmitter assembly) may be positioned substantially coincident with the center axis 524, such a configuration is not required. Instead, as shown in FIG. 5, the first centroid 508 (or apex of the lens) may be offset by a first offset distance d, whereas the second centroid 512 (or apex of the second lens) may be offset from the first centroid 508 (or apex of the first lens) by an offset distance D.

FIG. 5 also shows that an intersection line 520 traveling through both the first centroid 508 and second centroid 516 is not parallel to any side of the body 500. Instead, the intersection line 520 is offset from the first axis 312, 428 by an offset angle $\theta$. The offset angle $\theta$ may correspond to any acute angle greater than zero degrees and less than ninety degrees. In some embodiments, the offset angle $\theta$ is between 1 degree and 30 degrees and, more specifically, approximately between 10 and 20 degrees. Using such an offset angle $\theta$ enables the centroids 508, 516 to be positioned closer together without negatively impacting the proximity sensing performance when an LED or VCSEL is used as the light source 108. Although not shown, it can be appreciated that the intersection line 520 also forms an acute offset angle with the center line perpendicular to the first axis 320, 436.

FIG. 6 shows a second schematic diagram where electrical connectors 612 on a bottom surface of the body 500 are shown relative to a first axis 604 and second axis 608 extending across the body 500. Here the first axis 604 bisects the body 500 in a first dimension whereas the second axis 608 bisects the body 500 in a second dimension that is substantially orthogonal to the first dimension. The first axis 604 and second axis 608 intersect one another at a point that is substantially the center of the body 500. These axis 604, 608, therefore, create a set of four quadrants on the body 504, where a first quadrant Q1 corresponds to an upper-left quarter of the body 500, a second quadrant Q2 corresponds to an upper-right quarter of the body 500, a third quadrant Q3 corresponds to a lower-right quarter of the body 500, and a fourth quadrant Q4 corresponds to a lower-left quarter of the body 500. The connectors 612 are also shown to be symmetrically disposed on the body 500 such that mirror images of the electrical connectors 612 are created across both the first axis 604 and the second axis 608. In other words, the first axis 604 and second axis 608 substantially divide the body 500 such that an even number of electrical connectors 612 are on each side of each axis 604, 608.

In the configuration shown in FIG. 6, the first centroid 508 of the transmitter assembly 504 is positioned on the first axis 604 whereas the second centroid 516 of the detector assembly 512 is positioned away from both the first axis 604 and the second axis 608 and within the first quadrant Q1. Another way to describe this configuration is that the first centroid 508 lies between a boundary of quadrants Q2, Q3 whereas the other centroid 516 is positioned within a quadrant Q1. In some embodiments, the centroids 508, 516 do not share a common quadrant. Rather, the first centroid 508 lies on the boundary between the second quadrant Q2 and third quadrant Q3 whereas the second centroid 516 lies in the first quadrant Q1.

FIG. 7 shows yet another variation of the configuration of FIG. 6, whereby neither centroid 508, 516 lies on a quadrant boundary. Instead, the first centroid 508 is positioned within the third quadrant Q3 while the second centroid 516 is positioned within the first quadrant Q1 (e.g., the quadrant that is diagonally opposed to the quadrant in which the first centroid 508 resides). By placing the centroids within diagonally-disposed quadrants, the transmitter assembly 504 can be brought closer to the detector assembly 512 as compared to if both assemblies were parallel to one another with respect to the first axis 604 or were both positioned on the first axis 604. This particular type of configuration helps to minimize the size of the overall body 500.

Figure 8:
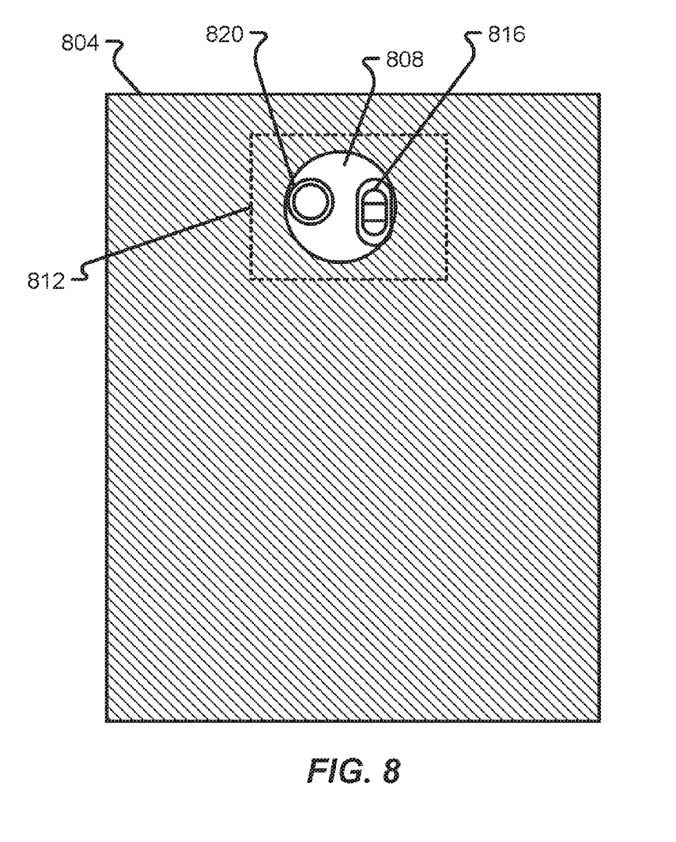
FIG. 8 depicts a computing device having an optical sensing module provided therein in accordance with embodiments of the present disclosure.

With reference now to FIG. 8, a computing or mobile device 804 having an optical sensing module 812 incorporated therein will be described in accordance with at least some embodiments of the present disclosure. The optical sensing module 812 may be similar or identical to any of the optical sensing modules 200, 400 described herein. Alternatively or additionally, the optical sensing module 812 may correspond to an instantiation of the sensing device 100 on the computing device or mobile device 804.

In some embodiments, the computing device or mobile device 804 may include any type of electronic device having one or more microprocessors and computer memory. Non-limiting examples of a computing device or mobile device 804 include smartphones, PDAs, laptops, tablets, personal computers, kiosks, Point of Sale (POS) devices, Automated Teller Machines (ATMs), etc. The computing/mobile device 804 may include a housing having a sensor opening 808 provided therein. The sensor opening 808 may correspond to a void or aperture in the housing material of the computing/mobile device 804 that enables the optical sensing module 812 to sense objects 124 beyond the housing. In some embodiments, the size of the sensor opening 808 may be on the order of 1.0 mm, although smaller openings may be used.

FIG. 8 also shows that the sensor opening 808 is sized to have both the transmitter assembly 816 and the detector assembly 820 exposed. The transmitter assembly 816 may be similar or identical to the transmitter assembly 504 while the detector assembly 820 may be similar or identical to the detector assembly 512. As can be appreciated, by using any of the diagonal or non-linearly-aligned configurations described herein, the distance between transmitter assembly 816 and detector assembly 820 can be minimized, thereby allowing the size of the sensor opening 808 to be minimized.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical sensing device, comprising:
   a substrate;
   a light source mounted on the substrate and configured to produce emitted light in response to receiving an electrical signal;
   a photodetector mounted on the substrate and comprising a photo-sensitive area that receives incident light and converts the received incident light into an electrical signal;
   a first optical element that is optically coupled to the light source and has a first centroid aligned on a first axis that is parallel with at least one side of the substrate and that intersects the photodetector; and
   a second optical element that is optically coupled with the photodetector and has a second centroid offset from the first axis by an offset distance.

2. The optical sensing device of claim 1, wherein the first axis substantially bisects the substrate into two equally-sized halves.

3. The optical sensing device of claim 1, further comprising:
   a cover that is substantially non-transparent to the emitted light, the cover having a first aperture and a second aperture.

4. The optical sensing device of claim 3, wherein a center of the first aperture is substantially coincident with the first centroid of the first optical element and wherein a center of the second aperture is substantially coincident with the second centroid of the second optical element.

5. The optical sensing device of claim 4, wherein the first optical element encapsulates the light source and wherein the first centroid of the first optical element is centered with respect to a first lens established on the first optical element.

6. The optical sensing device of claim 5, wherein the second optical element encapsulates the photodetector and wherein the second centroid of the second optical element is centered with respect to a second lens established on the second optical element.

7. The optical sensing device of claim 5, wherein the first aperture is larger than the second aperture.

8. The optical sensing device of claim 2, wherein the first optical element comprises a first alignment structure that aligns the cover with respect to the substrate and that further mates with the cover and wherein the second optical element comprises a second alignment feature that also aligns the cover with respect to the substrate and that further mates with the cover.

9. The optical sensing device of claim 1, wherein the offset distance is greater than zero and less than 30% of a longest dimension of the substrate.

10. The optical sensing device of claim 1, further comprising:
    a plurality of electrical connectors established on the substrate, wherein the plurality of electrical connectors are symmetrically disposed along the substrate with respect to the first axis.

11. A computing device, comprising:
    a housing;
    a sensing opening provided in the housing; and
    an optical sensing module, comprising:
      a substrate;
      a light source mounted on the substrate and configured to produce emitted light in response to receiving an electrical signal;
      a photodetector mounted on the substrate and comprising a photo-sensitive area that receives incident light and converts the received incident light into an electrical signal;
      a first optical element that is optically coupled to the light source and has a first centroid aligned on a first axis that is parallel with at least one side of the substrate and intersects the photodetector; and
      a second optical element that is optically coupled with the photodetector and has a second centroid offset from the first axis by an offset distance.

12. The computing device of claim 11, wherein the light source comprises a light-emitting die, wherein a center of the light-emitting die is substantially aligned with the first centroid, wherein the photodetector is provided as an array of photo-sensitive pixels on an Integrated Circuit (IC) chip, and wherein a center of the array of photo-sensitive pixels is substantially aligned with the second centroid.

13. The computing device of claim 11, wherein the optical sensing module further comprises a cover having a first aperture and a second aperture, wherein the first aperture is larger than the second aperture, wherein a center of the first aperture is substantially aligned with the first centroid, and wherein a center of the second aperture is substantially aligned with the second centroid.

14. The computing device of claim 11, wherein the sensing opening is sized to enable light emitted by the light source to travel to an object and to enable light that reflects from the object to reach the photodetector.

15. An optical sensing device, comprising:
   a substrate;
   a light source mounted on the substrate and configured to produce emitted light in response to receiving an electrical signal;
   a photodetector mounted on the substrate and comprising a photo-sensitive area that receives incident light and converts the received incident light into an electrical signal;
   a first optical element that is optically coupled to the light source and has a first centroid aligned on a first axis that is parallel with at least one side of the substrate, wherein the first axis substantially bisects the substrate into two substantially equally-sized halves; and
   a second optical element that is optically coupled with the photodetector and has a second centroid offset from the first axis by an offset distance.

16. The optical sensing device of claim 15, wherein the first optical element comprises a first alignment structure that aligns the cover with respect to the substrate and that further mates with the cover and wherein the second optical element comprises a second alignment feature that also aligns the cover with respect to the substrate and that further mates with the cover.

17. The optical sensing device of claim 15, wherein the offset distance is greater than zero and less than 30% of a longest dimension of the substrate.

18. The optical sensing device of claim 15, wherein the light source comprises a light-emitting die, wherein a center of the light-emitting die is substantially aligned with the first centroid, wherein the photodetector is provided as an array of photo-sensitive pixels on an Integrated Circuit (IC) chip, and wherein a center of the array of photo-sensitive pixels is substantially aligned with the second centroid.

19. The optical sensing device of claim 15, further comprising:
   a cover having a first aperture and a second aperture, wherein the first aperture is larger than the second aperture, wherein a center of the first aperture is substantially aligned with the first centroid, and wherein a center of the second aperture is substantially aligned with the second centroid.

20. The optical sensing device of claim 15, wherein the first optical element comprises a first lens having a first apex that is coincident with the first centroid and wherein the second optical element comprises a second lens having a second apex that is coincident with the second centroid.

* * * * *